US008566681B1

United States Patent
Gilson (10) Patent No.: US 8,566,681 B1
(45) Date of Patent: Oct. 22, 2013

(54) DISTRIBUTED DATA DISTRIBUTION

(75) Inventor: Ross Gilson, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 13/444,341

(22) Filed: Apr. 11, 2012

(51) Int. Cl.
*H03M 13/00* (2006.01)
*G06F 15/16* (2006.01)

(52) U.S. Cl.
USPC .................. 714/784; 714/752; 709/231

(58) Field of Classification Search
None
See application file for complete search history.

(56) References Cited

PUBLICATIONS

"BitTorrent (protocol)," retrieved from http://en.wikipedia.org on Apr. 9, 2012.
"Parchive," retrieved from http://en.wikipedia.org on Apr. 9, 2012.
"Server-side Solution," IPTV Server Solution, ConnecTV Media International, retrieved from www.connectv.ca/serversolution.aspx on Apr. 9, 2012.
Byers, John, lecture for CS 559: "Algorithmic Aspects of Computer Networks," Boston University, Sep. 12, 2007, accessed via http://www.cs.bu.edu/fac/byers/courses/559/F07/SCRIBE/scribe-notes-9-12.
Gemmell, Jim, "Fcast Multicast File Distribution: Tune In, Download and Drop Out," Proceedings of the IASTED International Conference of Internet Multimedia Systems and Applications, Oct. 18-21, 1999, Nassau Bahamas.

*Primary Examiner* — Guerrier Merant
(74) *Attorney, Agent, or Firm* — Banner & Witcoff, Ltd.

(57) ABSTRACT

Data may be distributed using data carousels. After a device receives the data, or a portion thereof, the device may make available a data carousel that allows others to receive the data. Each data carousel may contain a portion of the data. Data carousels may also contain error correction information that can be used to reconstruct missing portions of the data being distributed. A carousel directory may keep track of the carousel structure and direct the behavior of devices that are receiving data and/or distributing data.

19 Claims, 9 Drawing Sheets

DISTRIBUTED DATA DISTRIBUTION

BACKGROUND

When a data file is distributed from a server, that server may become overloaded when a large number of users seek the file. The load from a large number of users may be distributed among multiple computers using peer-to-peer (P2P) networking technologies. Although P2P technologies spread the load of distributing a file across multiple hosts, they may not reduce the total amount of network bandwidth needed to distribute a file because each user still may receive its own dedicated transmission of the file from the hosts. There is a need for data distribution methods that are more scalable and efficient.

SUMMARY

According to one aspect of the disclosure, a device may identify a plurality of data carousels, each of which may multicast data. The carousels may each contain a portion of a file. The device may receive the file by accessing some or all of the carousels in the plurality of data carousels. The carousels may be accessed sequentially and/or simultaneously.

According to another aspect of the disclosure, data received from a data carousel may be evaluated, and missing portions may be identified. Missing portions may be downloaded from a data carousel. Missing portions may also be reconstructed using error correction information, which may be (or have been) received from a data carousel. The error correction information may be organized such that a block of error correction information can be used to reconstruct any one block of an original file.

According to a further aspect of the disclosure, a device may choose which data carousels to access based on determining the combination of carousels that is expected to provide the highest throughput of non-duplicative information. Information may be duplicative because it is expected to be transmitted from another carousel that a device is accessing. Information may also be duplicative because it was already received.

According to yet another aspect of the disclosure, a carousel directory may store a listing of carousels containing all or a portion of a file. A carousel directory may be implemented as a dedicated device, or a carousel directory may be implemented on a device that also hosts one or more carousels. There may be more than one carousel directory per file. Every device that hosts a carousel containing a portion of a file may act as a carousel directory for the file. Devices that do not host a carousel containing a portion of the file may also act as a carousel directory for the file.

According to a still further aspect of the disclosure, a carousel directory may organize which portions of a file appear, reside, or are stored in the carousel(s) hosted by each device. A carousel directory may organize the carousels in accordance with a data set that defines the topology of a tree-like structure of carousels. Each level of a tree may enable an entire file to be transmitted, and each level of the tree may distribute the file over a greater number of carousels than the previous level. The portion of a file transmitted in a carousel from a device may be changed in order to adjust to changes in the tree, such as another carousel becoming available or unavailable.

The preceding presents a simplified summary in order to provide a basic understanding of some aspects of the disclosure. The summary is not an extensive overview of the disclosure. It is intended neither to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and is not limited in the accompanying figures.

DETAILED DESCRIPTION

In the following description reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1A:
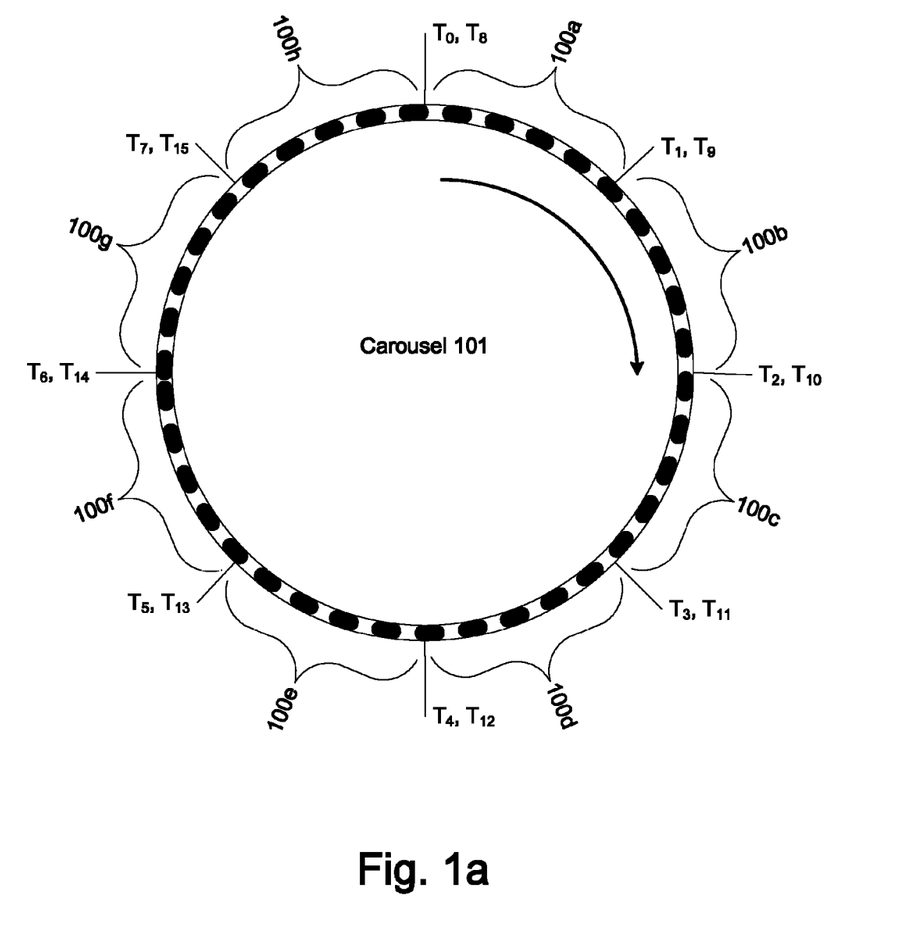
FIGS. 1a-1c illustrate several examples of data carousels.

FIG. 1a illustrates data carousel 101, which may be a continuous, repeating transmission (e.g., stream) of data. Although the term "carousel" is used, the disclosure covers and is applicable to other concepts for delivering data in a continuous style. Because the data transmitted from data carousel 101 repeats, data carousel 101 is illustrated as a loop. The term "multicast data carousel" refers to a data carousel from which data is transmitted using multicast transmission. Data carousel 101 may be a multicast data carousel, or it may transmit data using other techniques, such as unicast, broadcast, etc. The data in a data carousel may be transmitted from a computing device, such as a server, to another device, such as a client, or it may be transmitted to any number of devices. As illustrated in FIG. 1a, transmission or access to of all of the data in carousel 101 may occur between times $T_0$ and $T_8$. The same portion of the data (100a) that was transmitted beginning at time $T_0$ is transmitted again beginning at time $T_8$. Similarly, data portion 100b is transmitted beginning at time $T_1$ and again beginning at time $T_9$, data portion 100c is transmitted beginning at time $T_2$ and again beginning at time $T_{10}$, etc.

Data 100 may be a file, such as a video file, an audio file, a computer program, a collection of smaller files, etc. All of data 100 may be obtained by accessing (e.g., subscribing to) carousel 101 for the length of the carousel. A device may begin receiving data from a carousel at any time. For example, a device may begin receiving data from carousel 101 at time $T_5$. All of data 100 may be received by continuing to access data carousel 101 until time $T_{13}$. Data 100 may be put into its original order after it is received.

Figure 1B:
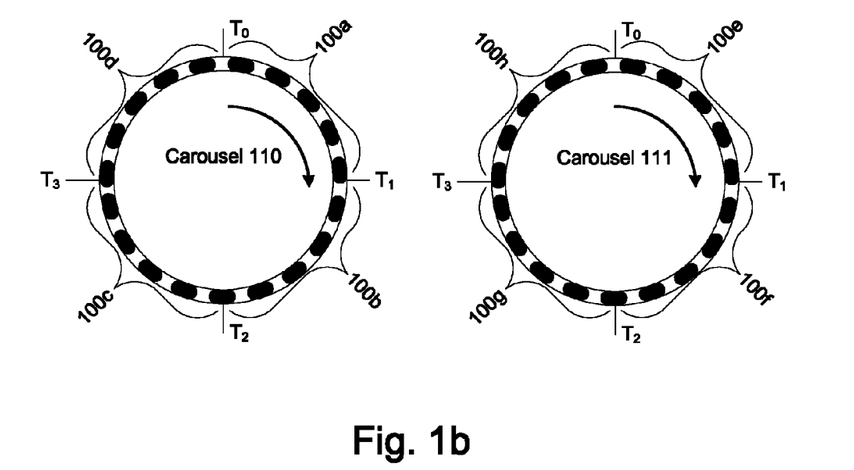

FIG. 1b illustrates two data carousels (110 and 111). Data carousel 110 contains one half of data 100, and data carousel 111 contains the other half. Data from carousels 101, 110, and 111 may be transmitted at the same rate (e.g., 1 Mbps). Thus, if a client receives data from carousels 110 and 111 simultaneously, all of data 100 may be obtained in half the time it would have taken to receive all of data 100 from carousel 101.

Figure 1C:
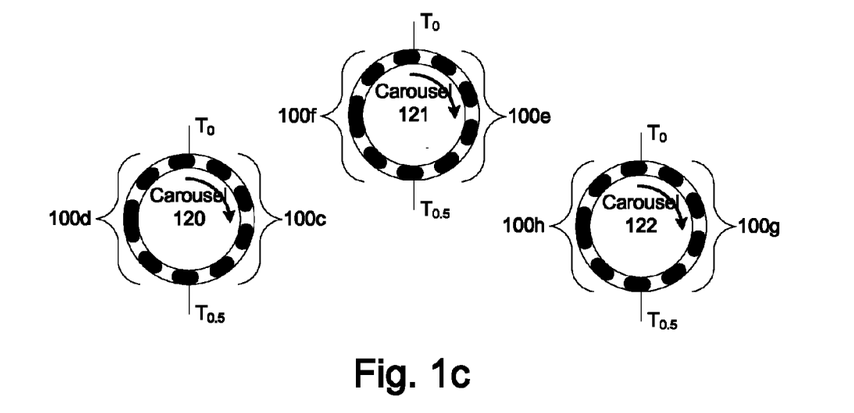

FIG. 1c illustrates three data carousels (120-122), each of which contains one quarter of data 100. The data in carousels 120-122 may transmit data at twice the rate (e.g. 2 Mbps) as the data in carousels 100, 110, and 111 of FIGS. 1a and 1b. Consequently, accessing carousels 120-122 simultaneously allows data to be obtained at six times the rate it is transmitted from carousel 101.

A carousel containing portions 100a and 100b of data 100 is not shown in FIG. 1c. A carousel containing only data portions 100a and 100b may not be available. Even if a carousel containing only data portions 100a and 100b is available, a client may not be able to receive its data. For example, the data connection between the client and one or more carousels may be too slow and/or congested to allow for the data from the carousel to be received. The data connection may be too slow in absolute terms. The data connection may also be too slow due to other traffic, such as the traffic from carousels 120-122 or other network issues.

Portions 100a and 100b, may be obtained, for example, from carousel 110 of FIG. 1b. Depending on the time a device first accesses carousel 110, all of data 100 may still be obtained faster by accessing to carousels 120-122 and 110 then by exclusively accessing carousels 110 and 111.

As the examples above illustrate, data, such as data 100, may be received from a variety of carousels. The carousels may be selected based on the portions of the data available on the carousels and/or the transmission rates of the available carousels. Where the data to be received spans multiple carousels, the data may be received from those carousels in a parallel manner and/or in a sequential manner. For example, a client may accesses a single carousel, and then access a different carousel. Another example is that a client may access a first group of carousels simultaneously, and then access a second group of carousels simultaneously. In some cases the second group of carousels may include one or more carousels that are also in the first group. A more detailed example of how a client or user may select which data carousels to access is discussed below with reference to FIG. 7.

As illustrated above, one advantage of using carousels, such as multicast carousels, is that clients may obtain data faster. Another advantage is that the load of transmitting a file may be spread across multiple devices. A further advantage is that the total bandwidth needed to distribute a file may be reduced. For example, only one copy of the data transmitted from a carousel may exist on the network link that connects to the device hosting a carousel, even though the data from the carousel may ultimately reach multiple clients. If unicast were used instead of multicast for transmission from the carousel, several copies of the data (one for each of the multiple clients) would exist on the network link that connects to the device transmitting the data. Nevertheless, the principles described herein may also be practiced without requiring multicast transmission in every case.

Figure 2:
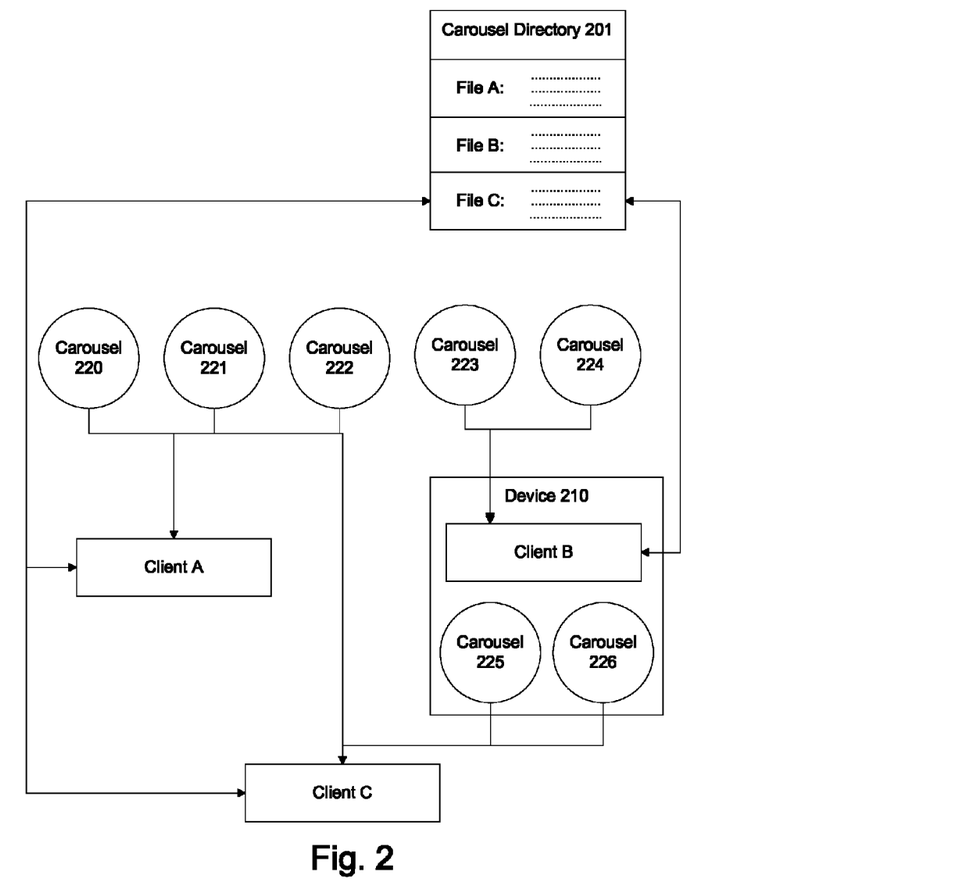
FIG. 2 illustrates an example of how files may be accessed from a plurality of carousels.

FIG. 2 illustrates an example of how data may be downloaded from a plurality of carousels. A client, such as client A, may communicate with carousel directory 201 in order to learn which carousels may be accessed in order to download a file, such as File C. A carousel directory may keep track of which carousels currently exist or are available. A carousel directory may also instruct devices to provide (e.g. host) carousels. As illustrated, client A accesses carousels 220, 221, and 222 in order to receive File C. Client A learned of at least these carousels from carousel directory 201. Another client, such as client B, may also contact carousel directory 201 in order to learn which carousels may be accessed in order to download a file. As illustrated, client B accesses carousels 223 and 224. Client B is located within device 210. Device 210 also hosts carousels 225 and 226, which may be accessed by other clients. For example, client C accesses carousels 222, 225, and 226 in order to obtain a file. Although illustrated as a separate device in FIG. 2, a carousel directory can be located in a device, such as device 210, that also hosts carousels and/or accesses carousels from other devices. A carousel directory may organize carousels into a tree-like structure or other structure, as will be discussed in more detail below with respect to FIG. 4.

Figure 3A:
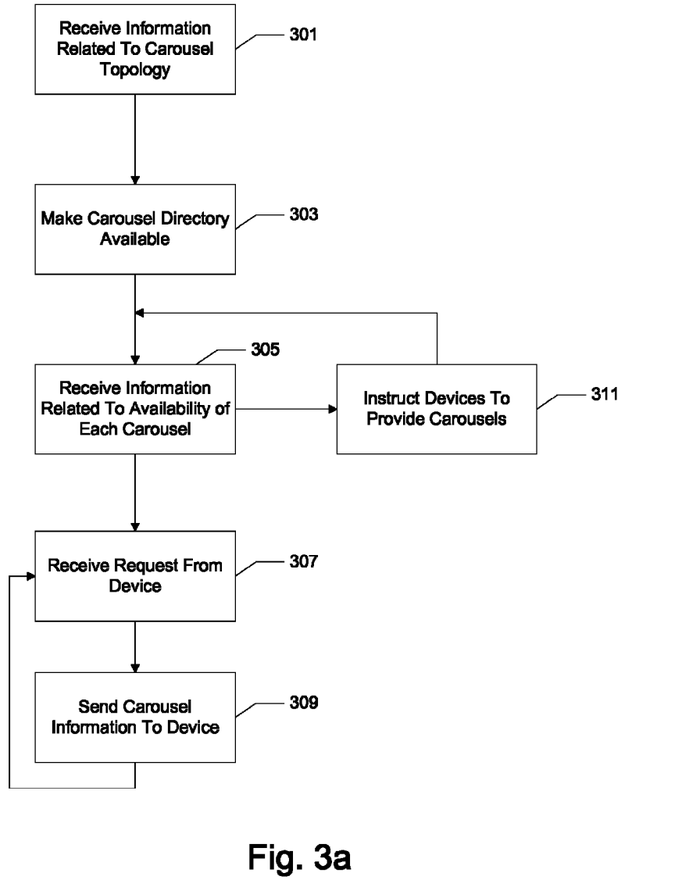
FIG. 3a illustrates a method that may be performed by a carousel directory.

FIG. 3a illustrates a method that may be performed by a carousel directory. In step 301, the carousel directory receives information describing the topology of a group of carousels. The topology information may be received from a user or from another computer. The carousels, which may be deployed in a tree-like architecture, may not exist yet. In some embodiments, a carousel directory manages the creation of carousels such that the carousels that do exist conform to the specified topology. The topology of an example involving a tree of carousels is discussed in more detail below with respect to FIG. 4. Other topologies or layouts may also be used.

In step 303, the carousel directory is made available to users. This may include making the carousel directory responsive to messages from other devices. It also may include allowing other devices to locate the carousel directory by publishing contact information for the carousel directory. For example, a DNS record may be created that allows a DNS lookup to return contact information for the carousel directory, such as an IP address or other network address. The DNS lookup may be one that specifies a specific file, such as a movie or video game. The DNS lookups for several files may resolve to the same device, as a device may act as a carousel directory for more than one file. The contact information may be contained in, for example, a text record of a DNS entry. Alternatively, or in addition, a website or other resource may be published that contains a link to a carousel directory.

Figure 3B:
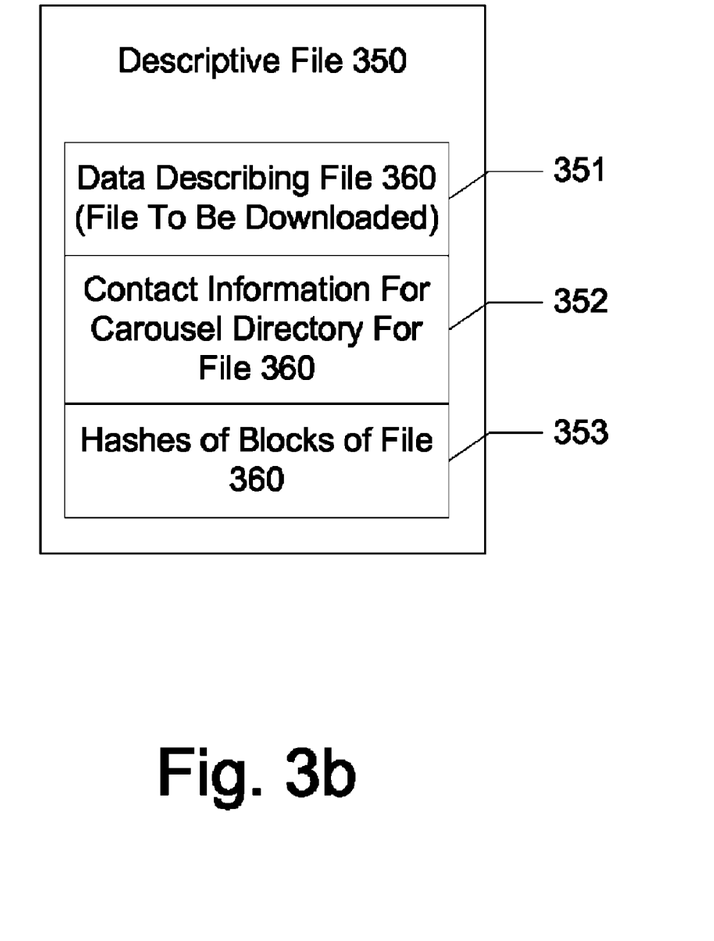
FIG. 3b illustrates an example of a file that generally describes data.

For example, a file that generally describes the data to be downloaded may contain a link to a carousel directory. An example of a descriptive file (350) is illustrated in FIG. 3b. This example has three fields, but more or less information may be included in other examples of descriptive files. Field 351 of file 350 includes data such as text describing the file to be downloaded, which is file 360 in this example. Field 352 includes contact information for a carousel directory for file 360. This contact information may be, for example, an IP address. Field 353 includes hashes of blocks of file 360. The hashes can be used to verify the integrity of the downloaded information. File 350 may also include further information, such as a digital signature identifying the source of file 360.

Instead of requiring clients to seek information about a carousel directory, a service provider may push contact information for carousel directories to clients. Similarly, a service provider may push descriptions of available files, such as descriptive file 350, to clients. Further, in some embodiments a carousel directory may push contact information for one or more carousels to clients.

In step 305, the carousel directory receives information, e.g. reports, concerning the availability of each carousel. The first time step 305 is executed, there may not be any existing or available carousels or the only existing carousel may be hosted by the carousel directory itself. Even if there are no existing carousels, the carousel directory may receive reports from other devices indicating whether the file the carousel directory is monitoring is available from the other devices. If so, the carousel directory may instruct some or all of the other devices to provide carousels containing portions of the file (or all of the file) in step 311. The carousel directory may also instruct the devices as to how quickly to transmit data from each carousel. Similarly, the device hosting the carousel directory may begin transmitting one or more carousels, which may each contain the file or a portion of the file. The portion of the file to be included in each carousel may be chosen such that the new carousel allows the set of all carousels to conform to the topology information received in step 301. The topology information received in step 301 may also govern whether a new carousel is added or an existing carousel is altered or removed.

In step 307, the carousel directory is contacted by a device, such as a computer, set-top box, mobile telephone, or other computing device, which may receive the file. The device may relay a message requesting information about how to download the file. In response, the carousel directory may send information about the carousel(s) hosting the file to the device in step 309. The carousel directory may send information about all of the carousels. Alternatively, the carousel directory may send information about only some of the carousels, thereby directing the device to use only certain carousels to receive the file. Examples of information about the carousels include IP addresses and port numbers, such as a multicast subscription address, URLs, or other network names, the portions of the file included in each carousel, the speed of each carousel, a schedule of when each portion of the data in a carousel will be transmitted from the carousel, the portion of a carousel's data that is currently being transmitted, historical availability of the device hosting a carousel, future planned changes to a carousel (e.g. changes in speed or changes in what content is included in the carousel), etc.

As a device receives the file, it may update the carousel directory as to the amount of the file that it has received. This information may be received in step 305, which may be performed on a continual basis. A device downloading a file may also send subsequent requests for information about the carousels in step 307. For example, the device may need an updated list of carousels, as some carousels may have become unavailable, new carousels may have become available, and existing carousels may have changed (e.g. a carousel's speed may have changed or the portion of the file included in a carousel may have changed). The carousel directory may also send such updates automatically. Many devices may download a file simultaneously. Thus, a carousel directory may perform steps 307 and 309 in parallel for a number of different devices.

The carousel directory may instruct that the carousels include a version number (or other identifier) of the current tree (or other topology) of carousels in step 311. The clients that receive data from the carousels would know whether the tree of carousels has changed by checking whether the version number has changed. Clients may use cached data, which was sent in step 309, until a change in the version number of the tree of carousels is detected. Once the new version number is detected, the client may request the updated information. This request may be received by the carousel directory in step 307.

As more devices download or otherwise access the file, those devices may be instructed to provide carousels that transmit all or a portion of the file in step 311. A carousel directory may periodically poll those devices to ensure they are still available and providing the carousels as part of step 305. If a carousel has become unavailable, the carousel directory may instruct a new device to provide the carousels that became unavailable in step 309. Further, a carousel directory may instruct some devices to stop providing one portion of the data and to begin providing another portion of the data. Dynamic re-organization of the carousels may be performed in order to maintain the organization of the carousels according to the topology information received in step 301 or to change the topology of the carousels to a more efficient topology.

In some embodiments, a device may provide a carousel without being instructed to do so by a carousel directory. For example, a device may analyze the information sent from a carousel directory in step 309 and, based on the information, determine that it will provide a new carousel. The device may determine the properties of the new carousel, such as the carousel's contents and speed. In some embodiments, the device may base its determinations on the same topology information that the carousel directory received in step 301. Further, in some embodiments, a carousel directory may not perform step 311 because, for example, each device independently determines which carousels to provide. Each device may report the carousels it is providing to the carousel directory.

The operation of a carousel directory may be decentralized. For example, each client may also be able to track existing carousels, instruct that carousels be brought online, specify the contents or speed of a carousel, etc. Having each client serve as a carousel directory may allow for an existing carousel directory to become unavailable without affecting the availability of a file.

Figure 4:
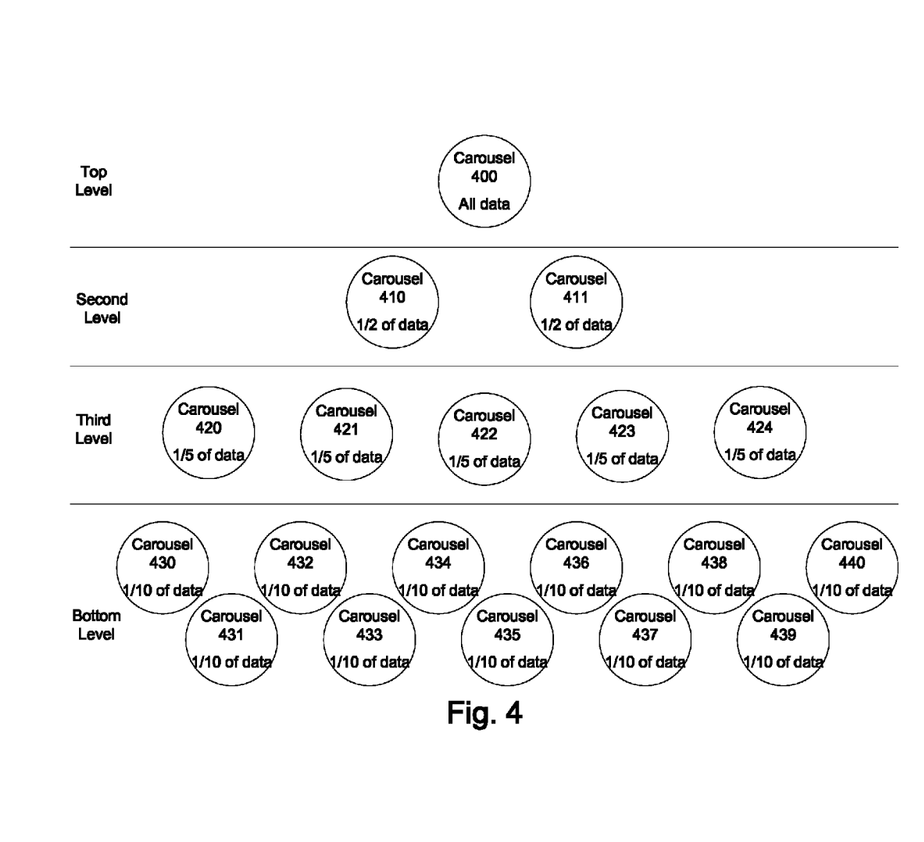
FIG. 4 illustrates an example of a data carousel architecture.

FIG. 4 illustrates an example of a tree topology of data carousels. This example shows how the data of a file may be distributed across several data carousels. Each data carousel may be located on a separate device, but some devices may host multiple carousels. Hosting multiple carousels on a single device may be advantageous where a device has access to a lot of bandwidth or other network resources. By hosting multiple carousels, each carousel may transmit data at a slower rate, thereby enabling devices with less bandwidth available to them to keep up with at least some of the carousels.

In the example shown in FIG. 4, each carousel transmits a portion of data 100, which may be, for example, a file. Carousel 400 contains all of data 100. Carousel 400 may be, for example, the carousel illustrated in FIG. 1*a*. Carousels 410 and 411 each contain half of data 100. Carousels 410 and 411 may be, for example, carousel 110 and 111 of FIG. 1*b*. Carousels 420-424 of FIG. 4 each contain one fifth of data 100. Carousels 430-440 each contain one tenth of data 100.

A device may begin transmitting data in a carousel even before it has received all of data 100. For example, a device may transmit a carousel containing data portions 100*e-h* of data 100 even before it has received data portion 100*a*. A device may have received data 100 (or a portion thereof) from carousels transmitted by other devices. For example, the device transmitting carousel 420 may have received data 100 from any combination of carousels 400-411. A device may receive data 100 from another source, including other carousels shown in FIG. 4 and carousels that are no longer available. Other examples of sources from which a device may receive data 100 include non-carousel transmissions from other devices and magnetic or optical media, such as hard drives or optical discs.

As was illustrated with respect of FIGS. 1*a*-1*c*, dividing data 100 across multiple carousels may increase the speed with which it may be downloaded. Conversely, transmitting new carousels that do not divide data 100 may increase the likely availability of the data. For example, if carousels 420-424 were the only carousels available, then the loss of any of these carousels would make it impossible to receive all of data 100. The existence of other carousels, such as carousels 400, 410-411, and 430-440 increases the likelihood that all of data 100 will remain available even if certain carousels become unavailable.

Organizing data carousels into a tree-type topology, such as the one illustrated in FIG. 4, balances speed of data distribution with availability of the data. In the example of FIG. 4, the number of carousels increases by 2.2 at each level. Levels of the tree are separated by horizontal lines in FIG. 4. The actual number of carousels in each level may be rounded to the nearest whole number. Thus the second level contains 2 carousels (2.2 rounded to 2), the third level contains 5 carousels (2.2*2.2=4.84, rounded to 5), and the fourth (bottom) level contains 11 carousels (4.84*2.2=10.648, rounded to 11). FIG. 4 is merely an example, and a different number of carousels may exist at each level of the tree.

The size of the data carousels at each level of the tree may be a function of the number of carousels at that level of the tree and the number of copies of data 100 included at that level of the tree. The data carousels at each level may, in combination, provide all of data 100. For example, carousels 410 and 411 each transmit half of data 100 and carousels 420-424 each transmit a fifth of data 100. Carousels 430-440 each transmit ¹⁄₁₀ of data 100. The data carousels at each level may, in combination, provide multiple copies of data 100. For example, each carousel of a level containing 10 data carousels include ⅕ of data 100, resulting in two copies of data 100 at this level.

A fractional number of copies of data 100 may also exist at a level. For example, there are 11 carousels at the bottom level of the tree illustrated in FIG. 4, and each contains ¹⁄₁₀ of data 100. Thus 1.1 copies of data 100 exists at the bottom level of the tree illustrated in FIG. 2. Including more than one copy of data 100 at a level may be done to reduce the likelihood of data unavailability at any level of the tree. For example, all of data 100 may be available from the carousels at the bottom level of the tree illustrated in FIG. 4 even if one of the carousels becomes unavailable. It is also possible that a level may not include all of data 100. This may be preferable where, for example, the devices that would be needed to include all of data 100 at the level do not yet have data 100 or are otherwise unavailable.

The number of copies of data 100 may vary by level. For example, data availability may be emphasized by including five copies of data 100 at the top level of a tree. The top level of this tree may include, for example, five separate carousels, each containing all of data 100.) Lower levels of a tree may emphasize data availability less by, for example, including only 1.2 copies of data 100 per level.

A tree may have a maximum depth. When this depth is reached, additional carousels may be added to the bottom level of the tree, even if doing so increases the number of carousels in the bottom level of the tree beyond the number of carousels per level used to define the rest of the tree. There may be a maximum number of carousels that may be added to the bottom level of the tree. This maximum number may be defined by the number of carousels per level or it may be defined by a separate number. Once the maximum number of carousels is reached, additional carousels may not be created. This allows a device to, for example, transmit data that corresponds to a different file instead of duplicatively transmitting a portion of data 100.

A minimum data carousel size may be defined. A minimum data carousel size may indirectly define a maximum depth of the tree because any the carousels in any lower levels of the tree would be smaller than the minimum data carousel size. For example, if ¹⁄₁₁ of the total data corresponds to the minimum data carousel size, then no lower levels of the tree shown in FIG. 4 may be created because any lower levels would have carousels that are smaller than the minimum size.

Levels of a tree may be created as the tree grows, but skipped over as time goes on. For example, carousels 400, 410, or 411 of FIG. 4 may not be replaced if they become unavailable, whereas other carousels, (such as, for example, carousels 430-440) may be replaced if they become unavailable. Further, the device transmitting one of carousels 400, 410, or 411 may be instructed to stop transmitting that carousel in order to replace one of carousels 430-440. Other properties of a tree may also vary as the tree grows. For example, the number of carousels on each level of the tree may increase as the total number of carousels increases.

Although data from some carousels may be transmitted at a specific speed, data from other carousels may be transmitted at the maximum speed allowed by a device's network connection or by a user's preferences. Alternatively, the speed with which data from a carousel is transmitted may be selected, by the transmitting device and/or by a carousel directory, based on the speed at which the carousel's recipients may receive data 100. For example, if carousel 400 is the first carousel from which data 100 is transmitted, data 100 may be transmitted at a speed that the devices hosting carousels 410 and 411 can keep up with. The device hosting carousel 400 may also adjust the speed of its carousel once additional carousels, such as carousels 410 and 411, become available.

Rules governing the topology of the tree (such as the properties discussed above, including the number of carousels per level, the number of copies of the file per level, and the maximum depth of the tree) may be defined by the first device to distribute a file on the network. These rules may be used by carousel directories to identify which new carousels should be added. The file being distributed, or a related file, may include the rules governing the topology of the tree. Where the rules, or any portion of the rules, are missing, default rules may govern. In some cases, default rules may override rules provided by the distributor of the file. For example, an internet service provider's devices may always transmit one or more carousels containing a certain amount of the original data and/or transmit data at a certain speed. This may be advantageous because, for example, these devices may become unavailable less frequently than other devices.

In some embodiments, more than one device may act as a carousel directory for a file. For example, in some embodiments all of the devices may track the organization of the tree. This may allow each device to select which portions of data 100 to include in a data carousel without receiving instructions from other devices.

A user or client accessing a data carousel may not be able to receive all of the data in the carousel. For example, a device transmitting data in a carousel may become unavailable before all of the data in the carousel is received. Another example of why a client may not be able to receive all of the data in the carousel is network congestion between the sender of the data carousel and the client. Similarly, portions of the data may be corrupted in transit. Data corruption may be detected, for example, by comparing a hash of the received data to a portion of the received data that indicates what the hash should be. If these hashes do not match, then the data was corrupted in transit. Error correcting codes, such as Reed-Solomon codes, may also be used to identify corrupted data.

The provider of a data carousel may not respond to requests for retransmission of missing or corrupted data. For example, data from a carousel may be transmitted in a multicast or broadcast fashion such that the provider of the carousel does not expect to receive traffic from recipients of the carousel. For example, a data carousel may be multicast using protocols such as Internet Group Management Protocol (IGMP).

A client may correct for missing or corrupted data by waiting for the same data to be transmitted again from the same carousel or from another carousel. However, the missing or corrupted data may be obtained faster by reconstructing the missing or corrupted portions using error correction information. The PAR file format used by the parchive open source software project contains an example of error correction information. The parchive format includes index files, which contain error detection information (such as a hashes of sections of the original data) and also error correction files, which include error correction information. The error correction information in the parchive format may be Reed-Solomon error correcting codes, which are generated from the original data. Other error correcting codes may also be used.

Where the error correction data format chosen is a Reed-Solomon error correcting code or a similar error correcting code, a single block of error correction information may be usable to correct or reconstruct any block of the received data. Further, any second block of error correction information may be usable to correct or reconstruct any second block of the received data, any third block of error correction information may be usable to correct or reconstruct any third block of the received data, etc.

Error correction information may be distributed in a unicast fashion. For example, a client may make a request for X blocks of error correction information, where X is the number of blocks of the file the client is missing, and X blocks of error correction information may then be sent from a server. Error correction information may also be distributed in carousels. The error correction information may be distributed in the same carousels as the file, or it may be distributed in one or more separate carousels from the file. These separate carousels may contain dedicated error detection information, such as hashes of the original data, but including dedicated error detection information is not necessary. A client may access an error correction carousel, which transmits error correction information, at any time. If the error correction information is in a format where a block of error correction information can be used to correct an error occurring anywhere in the received data, then every block of error correction information received from the error correction carousel may be used to repair or construct a portion of the original data. Thus, receiving error correction information from an error correction carousel and reconstructing a missing or corrupted block of the original data using the error correction information may be faster than waiting for the missing or corrupted block of original data to be transmitted from a carousel. A device may choose to reconstruct a block from error correction information even if it never attempted to download the block in its original form. This may occur to save time, because the block is not available in its original form, as a matter of preference, or for any other reason.

Similar to how including more than one copy of a file in a level of the tree of carousels may enhance data availability, including error correction information in carousels may enhance data availability. In both cases, the portion of the data that was distributed from a carousel that goes offline may be obtained from another source.

Figure 5:
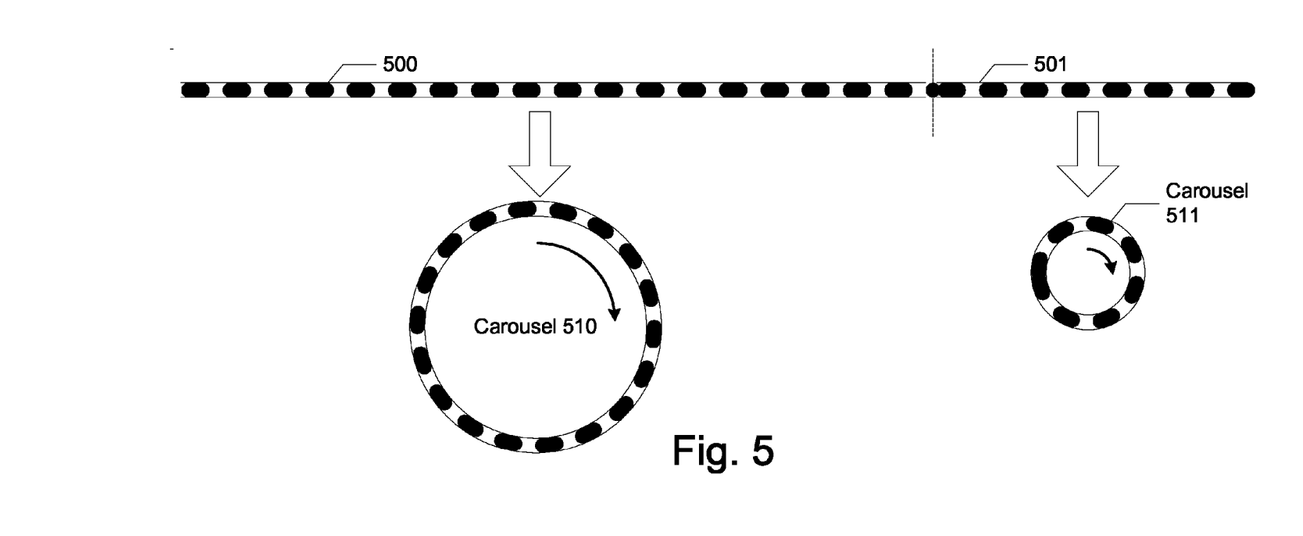
FIG. 5 illustrates an example of data carousels.

FIG. 5 illustrates an example of two carousels: one that includes a portion of a file in its original form and one that includes error correction information. As shown in FIG. 5, data 500 may be transmitted in carousel 510, and error correction information 501 may be transmitted in error correction carousel 511. Error correction information 501 may be calculated from data 500, or it may be received from another source, such as another error correction carousel. As illustrated in FIG. 5, there is less error correction information than original data. This is because a maximum number of transmission or other errors in the original data may be assumed, and error correction information enabling correction beyond this maximum number of errors need not be provided. If additional errors do occur, the missing data can be obtained from a carousel that transmits the original data. A carousel directory may adjust the amount of error correction information provided in response to feedback from clients on the amount of error correction information needed to obtain all of the original data.

Although a single device may transmit data from both a regular data and an error correction carousel, individual devices may also transmit only one type of carousel. For example, a tree of error correction carousels may be constructed in parallel with a tree of original data carousels. Both trees may have structures similar to those discussed above with respect to FIG. 4. The error correction tree may have a different structure, such as a different maximum depth, than the original data tree. The relationship between the original topology and the error correction topology may be predefined. Alternatively, the relationship may be specified (or a default may be overridden) by data associated with the original data file.

Alternatively, a single tree or other topology may be used for both the original data and the error correction information. Each level of the tree may include error correction carousels. Optionally, error correction carousels may appear on some, but not all, levels of the tree.

Instead of dividing the amount of data to be transmitted from each carousel evenly across the carousels at each level of a tree, the amount of data to be transmitted from each carousel may be determined based on other factors, such as upload bandwidth (e.g., the bandwidth at which each carousel is able to transmit data).

Figure 6:
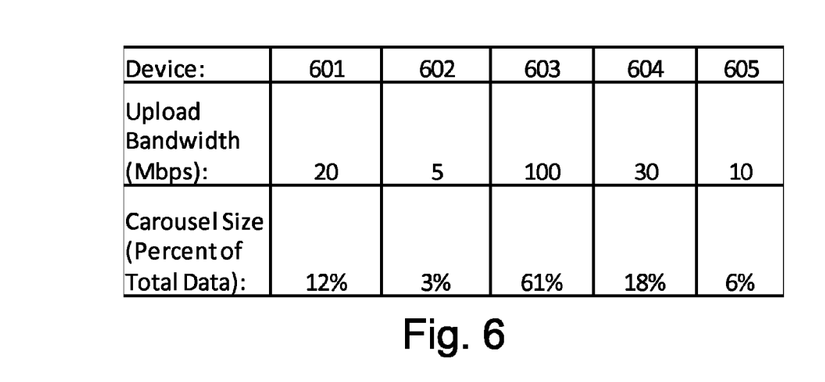
FIG. 6 shows a table that illustrates an example of a distribution of carousel sizes according to upload bandwidth.

FIG. 6 shows a table that illustrates an example of a distribution of carousel sizes according to upload bandwidth capabilities. In this example, the total upload bandwidth of the five devices (601-605) is 165 Mbps. The carousel size for each device may be calculated by taking its upload bandwidth and dividing it by the total upload bandwidth (165 Mbps). For example, the calculation for device 601 is 20 Mbps upload bandwidth/165 Mbps total bandwidth=12%. Thus, device 601 will host a carousel that is 12% of the total size of the data being distributed. The error correction information may be handled by additional devices. Alternatively, the total size of the data may include error correction information. Further, the error correction information may be weighted more heavily than the original data when determining the total data size. For example, the data may total 925 MB, and the error correction information may total 25 MB. If the error correction information is weighted three times more heavily than the data, then the total data size is 925 MB+3*25 MB=1000 MB. Device 601, for example, would transmit 120 MB of data in its carousels (12% of 1000 MB). This may be 120 MB of any type of data. In one example, device 601 may host two carousels: a data carousel of 111 MB (12% of 925 MB) and an error correction information carousel of 9 MB (12% of 3*25 MB). In this example, the data carousel and the error correction carousel may be available from device 601 on different IP addresses and/or different ports.

Figure 7:
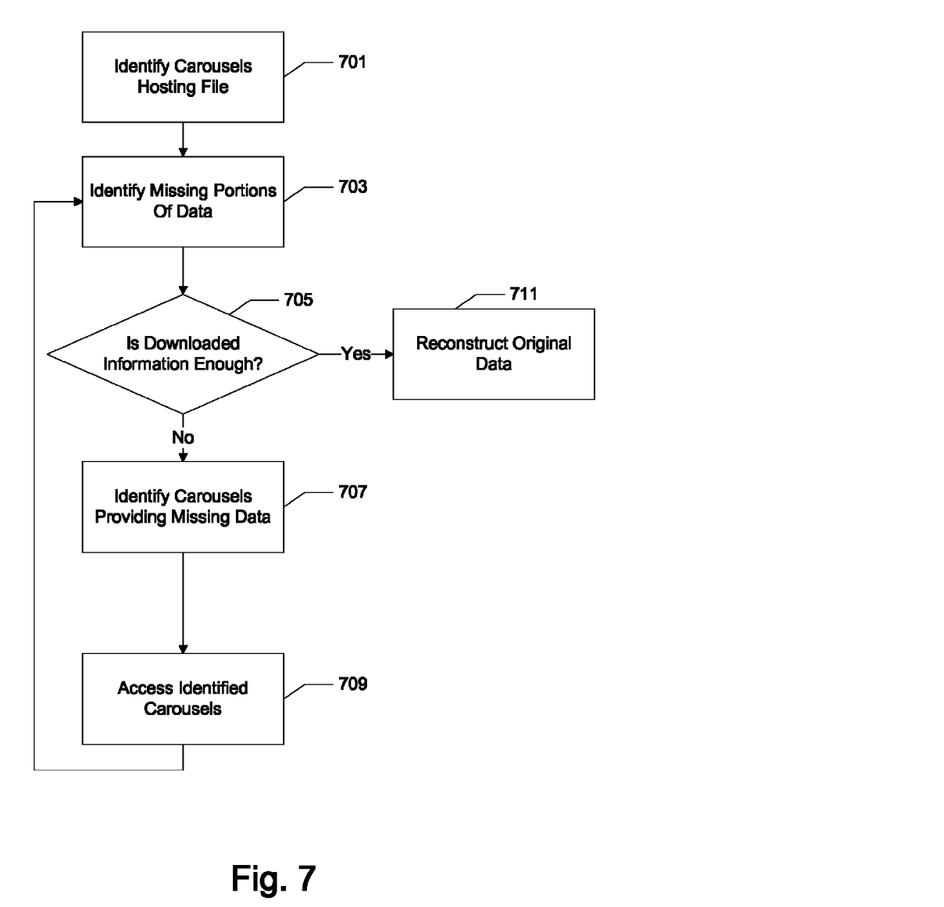
FIG. 7 illustrates a method of obtaining data from data carousels.

FIG. 7 illustrates a method of obtaining a file from data carousels, such as the ones illustrated in FIG. 4. First, in step 701, the carousels hosting the desired file are identified. This may be accomplished by consulting a carousel directory for the file. The carousel directory may identify, for example, each carousel, the speed with which the data in each carousel is transmitted, the portion of the file (and/or error correction information) included in each carousel, and where each carousel is in its transmission cycle (e.g. block m out of a total of n). Knowing where each carousel is in its transmission cycle allows a client to calculate how long it has to wait until any particular block of data is transmitted from the carousel.

In step 703, the missing portions of the file are identified. When a file is first being downloaded, all of the data may be missing. In step 705, it is determined if enough information has been obtained to reconstitute the file. If not, then in step 707 one or more carousels providing the data that is still needed are identified. Where the needed data is available from multiple carousels, step 707 may include selecting which carousel(s) to access. This may be done by identifying each carousel that supplies needed data and determining which combination of those carousels will most effectively use the download bandwidth that is available. For example, if 50 Mbps of bandwidth is available for use in downloading data 100, and carousels are transmitting needed data at 20 Mbps, 25 Mbps, 30 Mbps, and 40 Mbps, then the 20 Mbps and 30 Mbps carousels may be selected. This combination uses all of the available bandwidth, whereas other combinations use only some of the available bandwidth or exceed the available bandwidth.

If a data carousel includes some information that is still needed but some information that has already been downloaded, that carousel may be ignored in favor of a carousel that includes only needed information. Combinations of carousels may be ranked by the expected throughput of needed data. For example, each combination of carousels that transmits data, in combination, at the available download bandwidth or less may be ranked according to the expected speed with which useful information (e.g. non-duplicative information) will be obtained from those carousels. The amount of non-duplicative information is the total amount of information transmitted from the combination of carousels, less any data that overlaps between the carousels, and less any data that has already been downloaded. The combination of carousels selected in step 707 may be the combination that delivers the largest amount of non-duplicative information per a given period of time.

Because nearby devices generally have lower latency and better throughput than devices that are more distant, carousels from nearby devices may be more likely to be identified in step 707 than carousels from more distant devices.

Once a significant amount of the data has been obtained, error correction carousels may tend to transmit the largest amount of useful information in a given period of time. This is because any piece of error correction information that has not already been downloaded may be useful for recovering missing blocks of data 100, but original data carousels may include information that is mostly duplicative of what has already been downloaded. Thus, the carousels identified in step 707 may include a greater number of error correction carousels once the majority of a file has been obtained.

In step 709, the carousels identified in step 709 are accessed in order to obtain data from them.

Once all the data from one or more carousels has been obtained, step 703 is repeated by identifying any missing portions of the data. This step may be performed simultaneously with receiving data from other data carousels. Where data is already being received from some carousels, the set of carousels identified in step 707 may include only additional carousels. Alternatively, the set of carousels identified in step 707 may not include the carousel(s) currently being accessed. If this is the case, the carousel(s) currently being accessed may be dropped (e.g., unsubscribed from) in favor of new carousels, which, in combination, are expected to allow for more efficient downloading of the file. The transition from accessing a first set of carousels to accessing a second set of carousels may occur instantly. In some embodiments, the second (or third, fourth, etc.) set of carousels may be identified in advance, and the transition to the next set of carousels may occur at a scheduled time, such as when all the data from one or more carousels has been received or when transitioning to the next set of carousels is first expected to allow for more efficient downloading of the file.

Where carousels are accessed by explicitly subscribing to them, carousels that are no longer being subscribed to may be explicitly unsubscribed from. Alternatively, where supported by the transmission protocols being used, a client may access only a portion of a carousel by specifying only the portions of a carousel that the client wishes to receive. Any unspecified portions of the carousel may not be sent by the upstream router. The portions of the carousel the client wishes to receive may be specified by, for example, sequence numbers, transmittal times, hashes of the data, any other identifiers or unique characteristics of the data, or any other identifiers or unique characteristics of packets or other structures that contain the data.

Identifying the missing portions of data in step 703 may include verifying the received data. Blocks of data for which a transmission error has been identified may be considered missing data, as that data still needs to be re-downloaded or regenerated using error correction information.

In step 705, it is determined whether the combination of downloaded original information and downloaded error correction information describes the entire file. If so, then in step 711 any error correction information may be used, in conjunction with the original downloaded information, to produce a complete copy of the file. (If the entire file is present, then no error correction information may be needed.)

Some systems do not allow data to be multicast or broadcast across network boundaries. Where multicast or broadcast data carousels are used and multicast or broadcast data is not permitted to cross a network boundary, the multicast or broadcast feed may be converted to a unicast feed and distributed to a device on the other side of a network boundary. The receiving device may then multicast or broadcast the data it received. Unicast may also be used even if multicasting or broadcasting is possible. For example, data may be transmitted in a unicast fashion if the number of devices attempting to download the data is small or if a carousel directory has not yet been established.

In some embodiments, data carousels, including, for example, multicast data carousels, may be created on-demand in response to a request from a client. For example, content may be distributed from a central server to one or more regional servers in response to a request from a regional server. Similarly, the number or devices dedicated to distributing carousels for a particular piece of data may vary depending on the number of clients seeking to receive the data. For example, the tree of carousels that distribute a first file, which is in low demand, may only have a depth of 2. But if the demand for the file increases, the maximum depth of the tree may increase. Similarly, some carousels may be added to the tree even without changing the maximum depth.

Reducing the distance between the transmitter of a data carousel and the client of a data carousel may reduce the total amount of network traffic needed to distribute a file. Reducing the distance between the transmitter of a data carousel and the client of a data carousel may also reduce the likelihood of transmission errors by reducing the likelihood that the data will encounter a congested portion of a network. An explicit preference for local carousels may be added to step 707 of the process described above with respect to FIG. 7 in order to encourage accesses to local carousels. For example, non-local carousels may be selected only if local carousels are not available, or the amount of non-duplicative data from a local carousel may be given twice the weight of non-duplicative data from a non-local carousel. Knowledge of whether a carousel is local may be pre-defined (for example, based on IP address), or it may be calculated based on, for example, the number of hops required to reach a carousel or the latency of communications with the carousel.

The above-described systems for distributing data may be used in a wide variety of environments. Examples include any time a centralized server distributes data to a large number of users. For example, network operators often send files, such a video files, from a central server to a variety of regional servers, such as servers that provide video on demand to end-users. Data carousels may be used to make the distribution of video files to regional servers and/or to end-users more efficient.

In some networks, enabling end-user-to end-user communications using the systems described above may be additionally advantageous because it may help reduce the amount to traffic flowing over a congested portion of a network. For example, a service provider may provide a relatively low-bandwidth data connection along the "last mile" between an end-user and the service provider's distribution network. There may be multiple end users on the other side of the relatively-limited "last mile" link. Data may be transferred between these end-users without burdening the "last mile" link. For example, files may be distributed between residents of an apartment or dormitory without traversing the "last mile" link back to the rest of the service provider's network. Another example is that files may be distributed between the members of a wireless network without traversing the "last mile" link back to the rest of the service provider's network. A service provider may choose to provide wireless networks from user devices to encourage such sharing. These wireless networks may be accessible to, for example, all subscribers of the service provider's network. These more widely-available wireless networks may be provided in addition to an individual users' private wireless networks.

Figure 8:
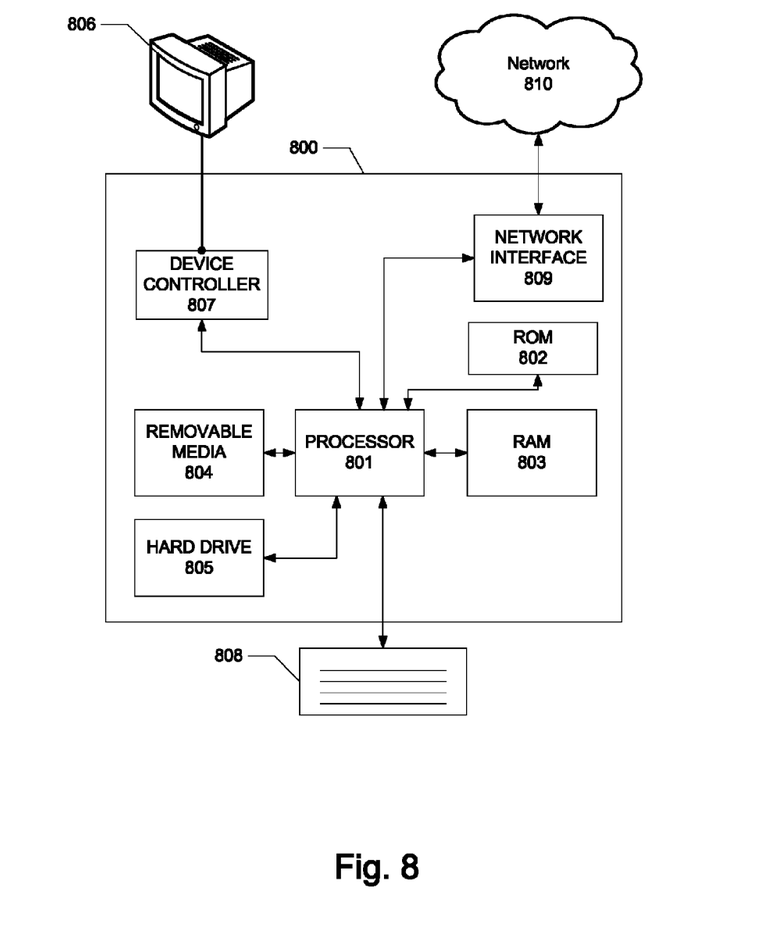
FIG. 8 illustrates an example computing device on which various methods and devices of the disclosure may be implemented.

FIG. 8 illustrates an example of general hardware and software structures that may be used to implement any of the various computing devices discussed above, such as device 210, any device that hosts and/or receives carousels, and any device that hosts a carousel directory. The computing device 800 may include one or more processors 801, which may execute instructions of a computer program to perform any of the features described herein. The instructions may be stored in any type of computer-readable medium or memory, to configure the operation of the processor 801. For example, instructions may be stored in a read-only memory (ROM) 802, random access memory (RAM) 803, removable media 804, such as a Universal Serial Bus (USB) drive, compact disk (CD) or digital versatile disk (DVD), floppy disk drive, or any other desired electronic storage medium. Instructions may also be stored in an attached (or internal) hard drive 805.

The computing device 800 may include one or more output devices, such as a display 806 (or an external television), and may include one or more output device controllers 807, such as a video processor. There may also be one or more user input devices 808, such as a remote control, keyboard, mouse, touch screen, microphone, etc. The computing device 800 may also include one or more network interfaces, such as input/output circuits 809 (such as a network card) to communicate with an external network 810. The network interface may be a wired interface, wireless interface, or a combination of the two. In some embodiments, the interface 809 may include a modem (e.g., a cable modem). Network 810 may include communication lines such as optical cables, coaxial cables, Ethernet cables, satellite or other wireless links (including cellular links), etc. Computing device 800 may connect to a plurality of networks simultaneously. Network interfaces 809 may have dedicated hardware for each network, or some or all of the hardware may serve multiple networks simultaneously.

The techniques described herein may be applied in any type of network, including optical networks, wireless networks, such as WiFi, WiMAX, "over the air" television, and cellular networks, satellite networks, hybrid-fiber-coax networks, Ethernet networks, etc. Further, the techniques described herein may be applied across more than one of type of network, including across the Internet.

One or more aspects of the disclosure may be embodied in computer-usable or readable data and/or executable instructions, such as in one or more program modules, executed by one or more processors or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium, as described above. As will be appreciated by one of skill in the art, the functionality of the program modules may be combined or distributed as desired in various illustrative embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of executable instructions and computer-usable data described herein.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps described above may be performed in other than the recited order, including concurrently, and that one or more steps may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
receiving a first set of data at a device, wherein receiving the first set of data comprises:
identifying at least a first and a second data carousel, each of which contains a different portion of the first set of data;
accessing each of the first and second data carousels;
receiving, at the device, data transmitted from each of the first and the second data carousels;
evaluating the data received at the device from the first and the second data carousels to identify which portions of the first set of data are missing or corrupted;
identifying at least a source that contains error correction information calculated from the first set of data;
receiving, at the device, the error correction information transmitted from the source; and
reconstructing the portions of the first set of data that are missing or corrupted at the device by combining the error correction information with the portions of the first set of data that have been received at the device.

2. The method of claim 1, wherein the device receives data from both the first and the second data carousels simultaneously.

3. The method of claim 1, wherein identifying at least a first and a second data carousel comprises:
receiving, at the device, information that identifies, for a plurality of data carousels, at least:
the portion of the first set of data included in each carousel, and
a speed with which data is transmitted from each carousel;
determining a rate at which non-duplicative portions of the first set of data may be received from several sets of one or more carousels, wherein each carousel in each set is selected from the plurality of data carousels; and
selecting one of the sets of carousels for which a highest rate was calculated.

4. The method of claim 1, further comprising:
transmitting, from the device, a portion of the first set of data in a third data carousel.

5. The method of claim 4, further comprising:
transmitting, from the device, error correction information that corresponds to the first set of data in a fourth data carousel.

6. The method of claim 4, wherein the portion of the first set of data included in the third data carousel is determined by comparing the portions of the first set of data available from other data carousels on a network to a set of information that specifies a topology of carousels.

7. The method of claim 4, wherein the portion of the first set of data included in the third data carousel is determined by receiving an indication of the portion to include in the third data carousel from a second device that organizes the carousels transmitted from several devices according to a set of data that describes a topology of carousels.

8. The method of claim 1, wherein the error correction information comprises Reed-Solomon error correcting codes.

9. The method of claim 4, further comprising:
stopping transmission of the third data carousel from the device in response to a change in the portions of the first set of data available from other data carousels on a network from when the third data carousel was initially transmitted; and
beginning transmission of a fourth data carousel from the device, wherein the fourth data carousel contains a different portion of the first set of data than the third data carousel.

10. The method of claim 1, wherein the first set of data is file-based data.

11. A method comprising:
transmitting a first set of data to a first device, wherein transmitting the first set of data comprises:
transmitting at least a first and a second data carousel, each of which contains a different portion of the first set of data;
receiving, from the first device, a request for the first set of data; and
transmitting to the first device, responsive to the request, an indication of a plurality of data carousels that are transmitting at least a portion of the first set of data, wherein the plurality of data carousels includes the first and second data carousels;
receiving, from the first device, instructions indicating portions of error correction information calculated from the first set of data received from the first and the second data carousels to be transmitted from a source;
transmitting to the first device the error correction information from the source; and
reconstructing portions of the first set of data that are missing or corrupted at the first device by combining the error correction information with the portions of the first set of data that have been received at the first device.

12. The method of claim 11, wherein the first and second data carousels are multicast data carousels.

13. A method comprising:
receiving, at a first device, a message from a second device that identifies a first set of data;
transmitting to the second device an indication of a plurality of data carousels that are transmitting at least a portion of the first set of data;
receiving, at the first device, an indication that the second device has received at least a portion of the first set of data;
transmitting, from the first device, an instruction to the second device to transmit a data carousel, wherein the instruction indicates a portion of the first set of data to include in the carousel to be transmitted from the second device;
evaluating the data received at the second device to identify which portions of the first set of data are missing or corrupted;
identifying at least a source that contains error correction information calculated from the first set of data;
receiving, at the second device, the error correction information transmitted from the source; and
reconstructing the portions of the first set of data that are missing or corrupted at the second device by combining the error correction information with the portions of the first set of data that have been received at the second device.

14. The method of claim 13, further comprising:
transmitting, from the first device, instructions to a plurality of additional devices, the instructions to the additional devices indicating portions of the first set of data to be transmitted from the additional devices in data carousels;

wherein the instructions to the second device and the plurality of additional devices instruct that data carousels be configured such that each data carousel individually includes less than all of the first set of data, but the carousels, in combination, include all of the first set of data.

15. The method of 14, further comprising:
transmitting, from the first device, instructions indicating portions of error correction information calculated from the first set of data to be transmitted in data carousels.

16. The method of 14, further comprising:
receiving, at the first device, information that specifies a topology for data carousels;
wherein the portions of the first set of data to be transmitted from the additional devices are calculated such that the data carousels conform to the specified topology.

17. The method of claim 14, further comprising:
transmitting, from the first device, a data carousel containing at least a portion of the first set of data.

18. The method of claim 13, further comprising:
instructing the second device to stop transmitting the portion of the first set of data and to instead transmit a data carousel containing another portion of the first set of data.

19. The method of claim 13, further comprising:
configuring a DNS record to resolve to a network address of the first device.

\* \* \* \* \*